J. Miller.
Washing Machine,
N°55,141. Patented May. 29, 1866.
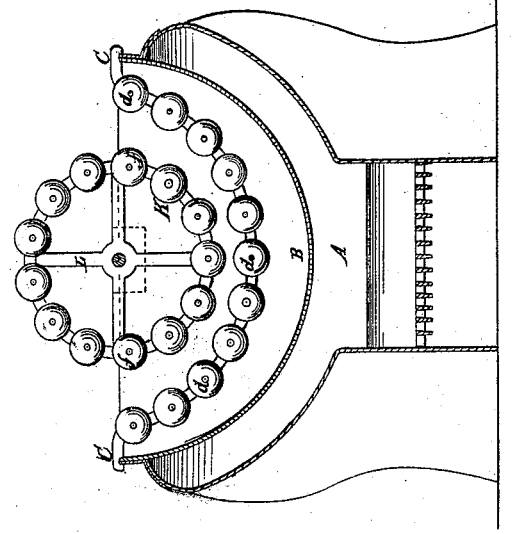
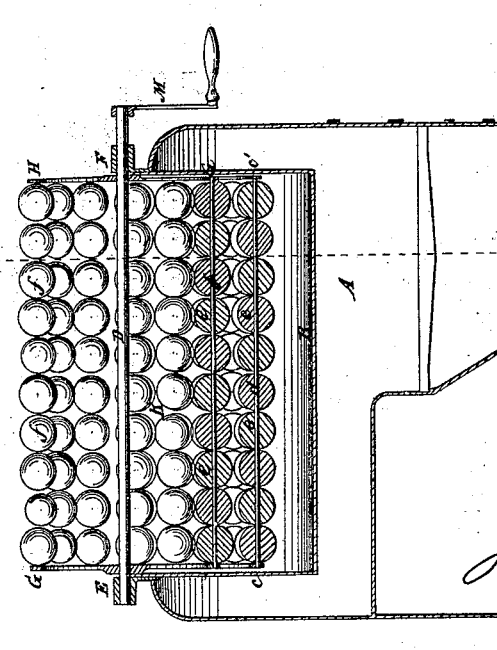
Witnesses.
J. D. Peyton.
Theodore Lang.
Inventor.
John Miller
By Baldwin
& Son
atty

UNITED STATES PATENT OFFICE.

JOHN MILLER, OF RUSSELLVILLE, KENTUCKY.

IMPROVED WASHING-MACHINE.

Specification forming part of Letters Patent No. 55,141, dated May 29, 1866.

*To all whom it may concern:*

Be it known that I, JOHN MILLER, of Russellville, in the county of Logan and State of Kentucky, have invented a new and useful Improvement in Washing-Machines; and I do hereby declare that the following is a full, clear, and exact description of the construction and operation of the same, reference being had to the annexed drawings, making a part of this specification, in which—

Figure 1 represents a vertical longitudinal section through my machine, and Fig. 2 a transverse section on the line $x\ x$ of Fig. 1.

It is the object of my invention to wash fibrous materials without unnecessary wear and under an elastic pressure; and to this end my invention consists in providing a rigid trough with a series of flexible bars covered with loose detached balls, in combination with a drum of flexible bars covered with loose detached balls to be rotated in or vibrated over the balls on the bars in the trough, while the materials to be cleansed are moved between the drum and bars.

The propriety of keeping the wash-water at an elevated temperature is so well known that I have a portable furnace, A, which receives a trough, B, supported in the furnace by a flange, so as to permit the trough to be entirely surrounded with the products of combustion, and keep it in all parts at a nearly equal temperature.

I construct a frame, C, of a concave form of side plates, $c$ and $c'$, that extend from one side of the trough B to the other, and are so curved at their ends as to rest upon the edges of the trough. These plates are connected by a series of rods, $d$, of any suitable metal, strung with wooden-balls $e$ so close together as just to permit each ball a free rotation on the rod to which it is attached. The rods, being riveted at each end to the side plates, $c$ and $c'$, constitute the frame C. This frame should extend from end to end of the trough, and the balls upon the frame should rest near the bottom of the trough, as shown in the drawings. The ends of the frame may rest on springs of any kind to render the whole frame yielding, if desired.

On a shaft, D, mounted in suitable bearings E and F in the center of the ends of the trough, I place two metal disks, G and H, so as to rotate close to the inner sides of the ends of the trough, and these disks are connected by metal rods $f$, on each of which a series of wooden balls are placed so as to cover the length of the rods, only leaving each ball free to rotate on its rod, and the rods are placed as close together on the disks as will permit the balls to rotate on the rods, which, being riveted to the disks at each end, constitute the drum K; or the rods, instead of being supported in disks, may rest in rims supported on the shaft D by arms L, as shown in Fig. 2.

The shaft D extends far enough beyond the trough at one end to receive a crank-arm, M, to turn or vibrate the drum; or this shaft D may be made to carry a pulley or a cog-wheel to be rotated by power.

The operation is as follows: A fire being kindled in the furnace, and water being placed in the trough, the clothes to be cleaned may be placed between the frame and the drum, when the rotation of the drum will press every part of the clothes, and each ball on both the rods of the drum and frame will rotate on its rod, while the pressed rods of the frame and drum will severally yield slightly to any inequality of thickness of clothes that may pass between them, and thus the clothes will be cleansed with the least possible wear, for they will be all the time under an elastic rolling pressure instead of a rigid rubbing friction.

The degree of elasticity may be increased by suspending the frame on springs, but this I have not found necessary.

The temperature of the water may, it is obvious, be kept at any degree desired, and when the clothes are cleansed thoroughly they may be withdrawn, or the drum may be removed, if necessary.

It is obvious that the drum may be continuously rotated in one direction, or that its motion may be reversed to press the clothes from one side of the trough to the other, or that it may be given a reciprocating movement, at the pleasure of the operator; and it is also obvious that the form of the trough may be varied without departing from the spirit of my invention.

What I claim as my invention, and desire to secure by Letters Patent, is—

1. The combination of the loose balled drum with the loose balled frame, constructed, arranged, and operating substantially as set forth.

2. The combination of the furnace, trough, drum, and frame, when constructed, arranged, and operating as described, for the purpose set forth.

In testimony whereof I have hereunto subscribed my name.

JOHN MILLER.

Witnesses:
EDM. F. BROWN,
J. I. PAYTON.